United States Patent
Wang et al.

(10) Patent No.: US 12,530,494 B2
(45) Date of Patent: Jan. 20, 2026

(54) SECURE ATTRIBUTION USING ATTESTATION TOKENS

(71) Applicant: Google LLC, Mountain View, CA (US)

(72) Inventors: Gang Wang, Mountain View, CA (US); Marcel M. Moti Yung, Mountain View, CA (US); Alex Daniel Jacobson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 619 days.

(21) Appl. No.: 17/928,646

(22) PCT Filed: Aug. 26, 2022

(86) PCT No.: PCT/US2022/041642
§ 371 (c)(1),
(2) Date: Mar. 2, 2023

(87) PCT Pub. No.: WO2023/028293
PCT Pub. Date: Mar. 2, 2023

(65) Prior Publication Data
US 2024/0220654 A1    Jul. 4, 2024

(30) Foreign Application Priority Data

Aug. 26, 2021  (IL) .......................................... 285887

(51) Int. Cl.
*G06F 21/62* (2013.01)
(52) U.S. Cl.
CPC ........ *G06F 21/6254* (2013.01); *G06F 21/629* (2013.01)
(58) Field of Classification Search
CPC .... G06F 21/44; G06F 21/6254; G06F 21/629; G06Q 2220/00; G06Q 30/018;
(Continued)

(56) References Cited

U.S. PATENT DOCUMENTS

| 2014/0150055 A1 | 5/2014 | Shimono |
| 2020/0280451 A1 | 9/2020 | Kinney et al. |
| 2020/0366754 A1 | 11/2020 | Wang et al. |

FOREIGN PATENT DOCUMENTS

| CN | 103282923 | 9/2013 |
| CN | 112771829 | 5/2021 |

(Continued)

OTHER PUBLICATIONS

Extended European Search Report in European Appln. No. 24170059.0, mailed on Aug. 1, 2024, 5 pages.

(Continued)

*Primary Examiner* — Theodore C Parsons
(74) *Attorney, Agent, or Firm* — Fish & Richardson P.C.

(57) ABSTRACT

Methods, systems, and apparatus, including computer programs encoded on a computer storage medium, for securely attributing a content platform while maintain user data privacy are described. In one aspect, a method includes receiving, by a content platform and from a first application executing on a client device, a request for digital components. The request includes a first anonymous token that includes a set of content. The content platform transmits, to the first application, a response including data for a digital component that includes content related to a second application and a hash value of the first anonymous token. The content platform receives, from the first application, a display notification indicating the display of the digital component via the application, the display notification including a second anonymous token and the hash value of the first anonymous token.

19 Claims, 5 Drawing Sheets

(58) Field of Classification Search
CPC ............ G06Q 30/0248; G06Q 30/0251; H04L 63/0807; H04L 63/126; H04L 63/1433; H04L 67/535
See application file for complete search history.

(56) References Cited

FOREIGN PATENT DOCUMENTS

| | | |
|---|---|---|
| CN | 113015974 | 6/2021 |
| WO | WO 2021158227 | 8/2021 |
| WO | WO 2021158229 | 8/2021 |

OTHER PUBLICATIONS

International Preliminary Report on Patentability in International Appln. No. PCT/US2022/041642, mailed on Mar. 7, 2024, 8 pages.
Office Action in Chinese Appln. No. 202280006821.9, mailed on Nov. 29, 2023, 12 pages (with English translation).
International Search Report and Written Opinion in International Appln. No. PCT/US2022/041642, mailed on Jan. 16, 2023, 13 pages.
Office Action in Indian Appln. No. 202327016702, mailed on Jun. 16, 2025, 6 pages (with English translation).

SECURE ATTRIBUTION USING ATTESTATION TOKENS

CROSS-REFERENCE TO RELATED APPLICATIONS

This application is a U.S. National Stage of International Application No. PCT/US2022/041642, filed Aug. 26, 2022, which claims priority to Israeli Application No. 285887, filed Aug. 26, 2021, the entireties of which are herein incorporated by reference.

BACKGROUND

Users engage in various online activities, and each of these activities results in the users being exposed to different information. Subsequent online activity such as downloading and installing applications by a user can be influenced by their previous activity and the information to which they were exposed. However, the influence of the previous activity on subsequent activity is difficult to evaluate especially in an environment where the client devices transmit requests and other data over public networks, such as the Internet. These communications can be altered by other parties, such as parties that intercept the communications and/or intermediaries that receive the communications and forward them to other parties.

In such environments, client devices are also subject to malicious attacks, such as viruses and malware that can send fraudulent requests without the user's knowledge or authorization. In addition, other parties can emulate a client device to send requests that appear to originate from the client device, but actually come from a device of the other parties.

SUMMARY

Various data security and authentication techniques described in this document can be used to prevent fraud and abuse and to protect the integrity of transactions over public networks. At the same time, some of the authentication techniques can implicate privacy concerns. For example, users of client devices may not wish to share information (such as stable device identifiers) that could be used to track client devices or the users of these client devices, and data providers may operate under privacy protection standards that prevent them from receiving or handling such information. The techniques and methods described in this specification can attribute data providers for providing digital components that lead to users performing specified user actions of downloading and/or installing applications on their client devices.

In general, one innovative aspect of the subject matter described in this specification can be embodied in methods that include the operations of receiving, by a content platform and from a first application executing on a client device, a request for one or more digital components, wherein the request includes a first anonymous token including (i) a set of content comprising at least data indicating a level of trust for the client device, (ii) a request creation timestamp, and (iii) a digital signature generated using the set of content; transmitting, by the content platform and to the first application, a response including (i) data for a digital component including content related to a second application and (ii) a hash value of the first anonymous token; receiving, by the content platform and from the first application, a display notification indicating the display of the digital component via the application, the display notification including a second anonymous token and the hash value of the first anonymous token; receiving, by the content platform and from the first application in response to an interaction with the digital component by the user of the client device, an interaction notification including a third anonymous token and a hash value of the second anonymous token receiving, by the content platform and from an attribution processing apparatus, a request for attribution; and generating and transmitting, by the content platform and to the attribution processing apparatus, a response to the request for attribution comprising the hash value of the first anonymous token, the hash value of the second anonymous token and a hash value of the third anonymous token. Other implementations of this aspect include corresponding apparatus, systems, and computer programs, configured to perform the aspects of the methods, encoded on computer storage devices.

These and other implementations can each optionally include one or more of the following features. Aspects can include generating, by the client device and based on the content related to a second application that was included in the digital component, an Universal Resource Locator (URL) for the second application stored in an application server, the URL comprising the hash value of the first anonymous token, the hash value of the second anonymous token and the hash value of the third anonymous token; redirecting, the first application to the application server using the URL; and in response to redirecting the first application to the application server, downloading, by the client device and from the application server, the second application.

Some aspects include transmitting, by a client device to a device integrity computing system, a request for N anonymous tokens and receiving, by the client device from the device integrity computing system, the N anonymous tokens.

Some aspects include storing, by the client device, the first anonymous token on the client device for a predetermined period of time. Generating the second anonymous token for inclusion in the display notification can include obtaining, by the client device, the first anonymous token that was stored on the client device; obtaining, by the client device, the hash value of the first anonymous token that was included in the response from the content platform; comparing, by the client device, a hash value of the first anonymous token that was stored on the client device and the hash value of the first anonymous token that was included in the response from the content platform; determining, by the client device that the hash value of the first anonymous token that was stored on the client device is identical to the hash value of the first anonymous token that was included in the response from the content platform; and generating, by the client device and in response to determining that the hash value of the first anonymous token that was stored on the client device is identical to the hash value of the first anonymous token that was included in the response from the content platform, the second anonymous token.

Some aspects include determining by the client device to not generate the second anonymous token, in response to not determining that the hash value of the first anonymous token that was stored on the client device is identical to the hash value of the first anonymous token that was included in the response from the content platform.

Some aspects include obtaining, by the attribution processing apparatus and from the application server, a first set of data comprising the hash value of the first anonymous token, the hash value of the second anonymous token and the hash value of the third anonymous token obtaining, by the attribution processing apparatus and from the response to the request for attribution, a second set of data comprising hash values received from the content platform; comparing, by the attribution processing apparatus, the first set of data to the second set of data; determining, by the attribution processing apparatus, that the first set of data matches the second set of data; and in response to determining that the first set of data matches the second set of data, attributing by the attribution processing apparatus, the content platform for the download of the second application.

In some aspects, each anonymous token includes a respective token including the set of content for the device integrity token, wherein the set of content for the device integrity token includes a verdict of trustworthiness indicating the level of trust for the client device, a timestamp indicating a time at which the verdict of trustworthiness was determined, and the public key data for the device integrity token. Generating each device integrity token includes digitally signing the set of content for the device integrity token using a private key of the device integrity computing system.

Some aspects includes determining respective attribution credits for multiple content platforms based on anonymous tokens for events related to the second application received from the multiple content platforms.

The subject matter described in this specification can be implemented in particular embodiments so as to realize one or more of the following advantages. Using attestation tokens to transmit data from client devices provides a secure communication channel between the client device and the computers or other devices of other entities. Including, with the attestation token, a digital signature of the data included in the attestation token enables the entities to verify that the data in the attestation token was not changed after the attestation token was created. In addition, the inclusion of a token creation time in the attestation token enables recipients to determine whether requests are new or potentially part of a malicious attack e.g., a replay attack.

The attestation token can also include a device integrity token that indicates the integrity of the client device that transmitted the attestation token, which enables the recipient (s) of the attestation token to verify that the data came from a trusted client device, e.g., rather than from an emulator or a compromised device. The device integrity token can be generated and digitally signed by a trusted device analyzer (e.g., a third-party device analyzer) so that recipients of the attestation token can verify that the client device was evaluated by a trusted device analyzer and that the data in the device integrity token was not modified after creation by the trusted device analyzer.

The techniques further determine the attribution of user action of downloading an application to a digital component or the entity that provided the digital component while preserving user privacy. The techniques can prevent malicious, e.g., fraudulent, claims by requiring the content platform requesting attribution provide hash values of attestation tokens that were used to report events and/or request the digital component that led to the download of the application. The use of attestation tokens for such reports and requests ensures that the messages are trustworthy and received from trustworthy devices, e.g., by including integrity tokens that attest to the trustworthiness of the devices. Using anonymous tokens, which are also referred to as attestation tokens, for such reports and requests protects user privacy by preventing entities that receive the messages from correlating the user with multiple messages and therefore prevents the entities from tracking the users across multiple messages which could correspond to different domains, applications, or application publishers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
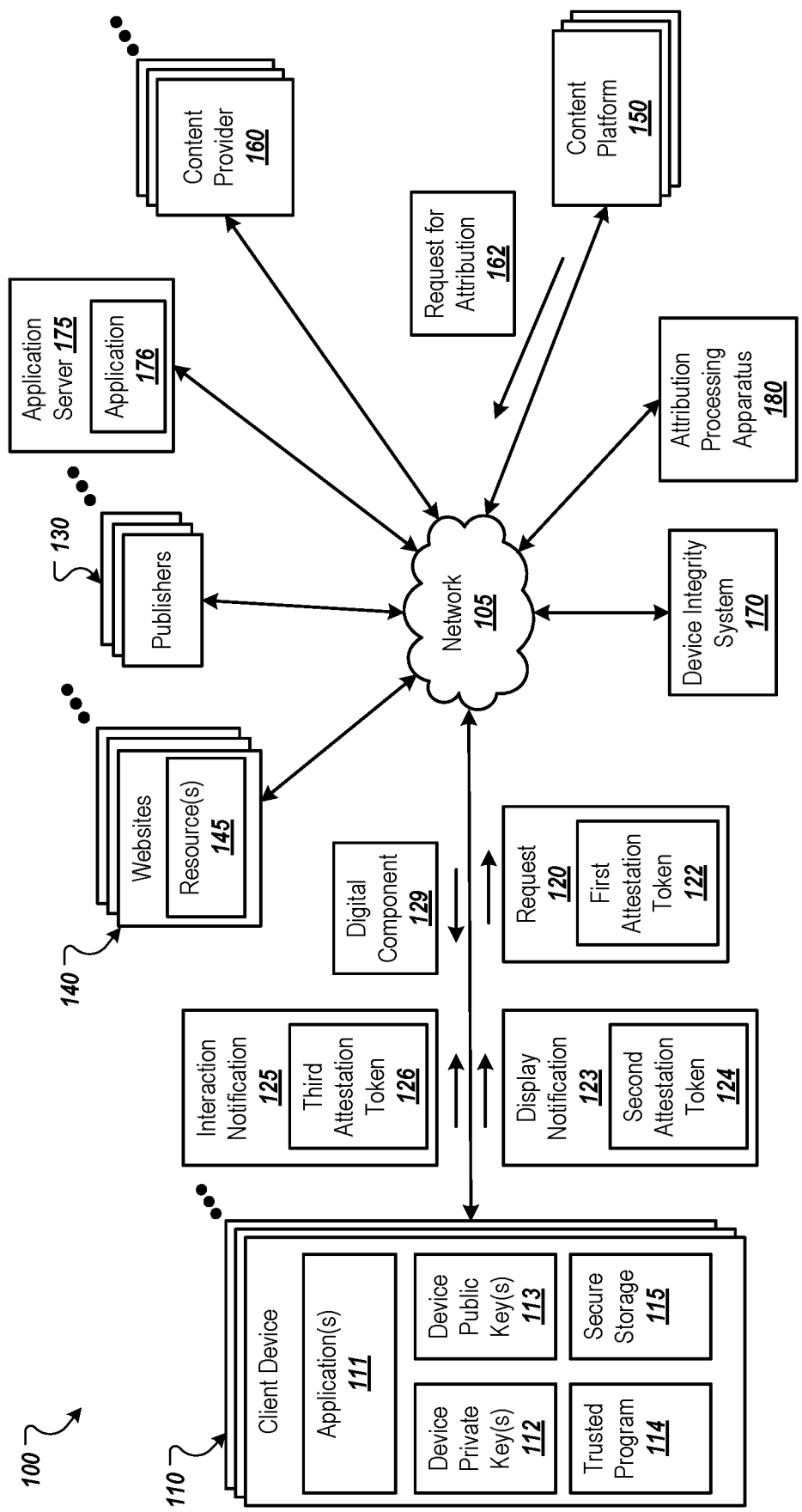
FIG. 1 is a block diagram of an environment in which a content platform distributes digital components.

Users connected to the Internet are exposed to a variety of digital content, e.g., search results, web pages, digital components, news articles, social media posts, audio information output by a digital assistant device, and so on. Some of these exposures to content may contribute to the users performing a specified target action. For example, a user that is exposed to a digital component, e.g., that views or to which the digital component is presented, about a map application may download and install the map application on the user's client device. In this example, downloading and installing the application can be considered the target user action performed by the user in response to being exposed to the digital component. Similarly, a user that is exposed to a digital component regarding a video streaming service may ultimately download and install an application of the video streaming service. In this example, downloading and installing the application is the target user action.

In an environment where multiple content platforms can provide digital components to a client device, it can be difficult to determine the platform to which to attribute the user action of downloading and/or installing an application. The systems and techniques described in this document can provide a secure communication channel between client devices and other entities, such as content publishers, content platforms, and content providers that create and provide digital components for distribution by the content platforms. The client devices can provide, with each different request and other data transmission over a network, a different attestation token that is used by the other entities to validate the integrity of the requests and the integrity of the client device. The requests can include, for example, requests to manage data of the users (e.g., to delete user-related data), requests for content, and/or requests for digital components to present with other content. Other data transmissions can include event reports for reporting events, such as digital component display events, user interactions with digital components, and/or the performance of specified user actions, e.g., the download of an application. Securing the communication channel using the attestation tokens ensures that malicious actors cannot change, delete, or otherwise access user data, or change the content of the requests, e.g., to deceive digital component distribution systems and/or providers.

In some approaches, the attestation token can be digitally signed using a private key of the client device. The client device can confidentially maintain the private key. The attestation token can include, among other things, a public key that corresponds to the private key, a payload, and a device integrity token. The device integrity token can include a verdict that indicates a level of integrity of the client device, as determined by a trusted device integrity system, e.g., a third-party device integrity system maintained by a trusted entity that is different from a user of the client device and the recipient of the attestation token. The device integrity token can also include the public key of the of the client device to bind the device integrity token to the client device.

The device integrity token can be digitally signed by the device integrity system using a private key that the device integrity system keeps confidential. A public key that corresponds to this private key can be provided to the recipients so that they can trust that the client device was evaluated by the device integrity system, e.g., by verifying the digital signature of the device integrity token using the public key. This combination of using two pairs of keys provides a secure communication channel that enables recipients to validate the integrity of client devices and the integrity of communications received from the client devices and binds the device integrity token to the client device so that other devices cannot use the device integrity token to falsify their integrity.

In some approaches, the device integrity system does not receive the raw data of the public keys for inclusion in the device integrity token. Instead, the client device can send a blinded public key or a blinded derivative of the public key (e.g., a blinded truncated cryptographic hash of the public key) by blinding the public key or its derivative using a blind signature scheme. With a blind signature scheme, the device integrity system can certify the integrity of the client device without receiving raw values of public keys of the client device, enhancing the privacy of the client device or user by reducing the risk of potential tracking of the client device or user of the client device via the public key. The device integrity system can publish blind signature verification keys that recipients can use to verify the blind signatures.

FIG. 1 is a block diagram of an environment 100 in which a content platform 150 distributes digital components 129 to client devices 110. The example environment 100 includes a data communication network 105, such as a local area network (LAN), a wide area network (WAN), the Internet, a mobile network, or a combination thereof. The network 105 connects client devices 110, publishers 130, websites 140, content platforms 150, a device integrity system 170 (which can also be referred to as a device integrity computing system), an application server 175, and an attribution processing apparatus 180. The example environment 100 can include many client devices 110, websites 140, publishers 130, content platforms 150, content providers 160, device integrity systems 170, and attribution processing apparatus 180.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL) that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, digital media players, smart speakers, and wearable devices (e.g., smart watches), game consoles, streaming devices, and other devices that can send and receive data over the network 105. A client device 110 typically includes applications 111, such as a web browser and/or native applications to facilitate the sending and receiving of data over the network 105. A native application is an application developed for a particular platform or a particular device. Publishers 130 can develop and provide the native applications to the client devices 110.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component 129 can electronically be stored in a physical memory device as a single file or in a collection of files, and digital components can take the form of video files, audio files, multimedia files, image files, or text files and include advertising information, such that an advertisement is a type of digital component. For example, the digital component 129 may be content that is intended to supplement content of a web page, resource, or application page presented by an application 111. More specifically, the digital component 129 may include digital content that is relevant to the resource content (e.g., the digital component may relate to the same topic as the web page content, or to a related topic). The provision of digital components 129 by content platforms 150 can thus supplement, and generally enhance, the web page content.

When the application 111 (also referred to herein as the first application) loads a resource 145 or application content that includes one or more digital component slots, the application 111 can request a digital component 129 for each slot from one or more content platforms 150. Some publishers 140 use a content platform 150 such as a supply side platform (SSP) to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Multiple publishers 140 may use the same SSP.

In some implementations, the content platform 150 can request digital components from content providers 160. The content providers 160 are entities that generate digital components for presentation with resources 145 and/or other content. An example content provider is an organization that publishes an application, e.g., a native application for mobile devices. This content provider may provide digital components that include, e.g., depict, content related to the application and a link to download the application. The content providers 160 can use content platforms 150 such as a demand side platform (DSP) to manage the provisioning of its digital components for presentation in digital component slots. A DSP is a technology platform implemented in hardware and/or software that automates the process of distributing digital components for presentation with the resources and/or applications. A DSP can interact with multiple SSPs on behalf of content providers 160 to provide digital components for presentation with the resources and/or applications of multiple different publishers 140. In general, a DSP can receive requests for digital components (e.g., from an SSP), generate (or select) a selection parameter for one or more digital components created by one or more content providers based on the request, and provide data related to the digital component (e.g., the digital component itself or a link to download the digital component) and the selection parameter to an SSP. The SSP can then select a digital component for presentation at a client device 110 and provide, to the client device 110, data that causes the client device 110 to display the digital component.

The content platform 150 can select a digital component for each digital component slot based on various criteria. For example, the content platform 150 can select, from the digital components received from the content providers 160, a digital component based on relatedness to the resource 145 or other application content, performance of the digital component (e.g., a rate at which users interact with the digital component), etc. The content platform 150 can then provide the selected digital component(s) to the client device 110 for presentation with the resource 145 or other application content. The content platform 150 can transmit selected digital components 129 to one or more client devices 110 for presentation by applications 111 operating on the client devices 110.

When the application 111 sends a request 120 over the network 105, the application 111 can send an attestation token 122 with the request. For example, if the application 111 such as a browser sends a request for digital components to the content platform 150, this request can include an attestation token 122. The attestation token 122 is used by entities such as content providers 160 to validate the integrity of the request and the integrity of the client device 110. For example, some malicious entities may attempt to falsify the parameters of the request for digital components, e.g., to specify different resources with which the digital component will be presented to the user and/or to specify a different user to which the digital component will be presented to make the request appear more valuable than it actually is. In addition, some malicious parties may attempt to emulate others' client devices for nefarious purposes. The attestation token 122 provides a secure communication channel between the client device 110 and the computers or other devices of other entities through intermediaries that prevents others from altering the requests 120 and ensures that the request 120 came from a validated client device 110.

The client device 110 can also include a trusted program 114 that generates the attestation tokens for the applications 111. The trusted program 114 can include trusted code from a reliable source that is difficult to falsify. For example, the trusted program 114 can be an operating system, a portion of an operating system, a web browser, etc. Generally, the trusted program 114 is difficult to infiltrate, and the amount of time and effort that a perpetrator would need to expend to tamper with the trusted program 114 is prohibitively high. Additionally, because the trusted program 114 is provided and maintained by a reliable source, any vulnerabilities that arise can be addressed by the source. Using such a trusted program in this way provides a technical advantage of increased security at the client device 110, since the trusted program 114 is difficult to infiltrate. Additionally, the trusted program 114 provides the advantage of mitigating vulnerabilities in the trusted program 114 because the trusted program 114 is maintained by a reliable source.

The trusted program 114 can be local to client device 110. For example, the trusted program 114 can be a device driver of the operating system of client device 110. In some implementations, the trusted program 114 operates entirely locally to client device 110, reducing the need to transmit user information. In some implementations, the trusted program 114 can operate locally to client device 110 and over a network, such as the network 105. For example, the trusted program 114 can be a web browser that is installed on user device 110 and transmits and receives information over the network 105.

The trusted program 114 can generate encryption keys (e.g., public/private key pairs), store encryption keys in secure storage 115 (e.g., a secure cache), store device integrity tokens in secure storage 115, generate attestation tokens, generate blind signatures of encryptions keys or derivatives thereof, and/or fetch and store certificates. In some implementations, the trusted program 114 interacts with a device integrity client to send to and receive data from the device integrity system 170.

To generate attestation tokens 122, the trusted program 114 of the client device 110 can generate encryption keys (e.g., public/private key pairs). The public/private key pairs can be asymmetric key pairs. Each public/private key pair includes a private key and a public key that correspond to, and is mathematically linked to, the private key. The client device 110 can transmit a request to a device integrity system 170 for one or more device integrity tokens. For example, the client device 110 can transmit a request to a device integrity system 170 for N device integrity tokens. Request for device integrity tokens can involve passing N public keys of the client device 110 to the device integrity system 170. In this example, the N public keys include the actual public keys, e.g., the raw data of the N public keys. The request can also include device-level fraud detection signals that include signals that can be evaluated to determine whether the client device 110 is trustworthy, e.g., has not been compromised and/or is not an emulator or bot. For example, the trusted program 114 can collect the device-level fraud detection signals and include the signals in the request.

The device integrity system 170 evaluates device-level fraud detection signals received from the client device 110, e.g., from the trusted program 114, and determines a level of trustworthiness (or integrity) of the client device 110 based on the device-level fraud detection signals. The device-level fraud detection signals can include data representing operating characteristics or metrics of the client device 110 that can be used to determine whether a client device is compromised and/or whether the client device is operating as a normal client device or an emulated client device. Certain operating characteristics and metrics are often different for genuine client devices relative to emulators. In some implementations, the device-level fraud detection signals include application-level fraud detection signals that include operating characteristics and metrics of the application 111 requesting trust tokens. The trusted program 114 can collect these device-level fraud detection signals and include the signals in the request for trust tokens.

The device integrity system 170 can issue a verdict that indicates the level of trustworthiness (or integrity) of the client device 110. The recipients of a request 120 or other communication that includes a device integrity token can use the verdict to determine whether to trust a request 120 (or other communication) that includes the verdict. For example, if the verdict indicates that the client device 110 is not trustworthy, the recipient can ignore the request, e.g., not respond to the request.

The device integrity system 170, in response to receiving the request for device integrity tokens from the client device 110, determines a level of trustworthiness of the client device 110. For example, the device integrity system 170 might have M possible levels of trustworthiness that each correspond to a respective verdict. In this example, the device integrity system 170 can select one of these M possible levels of trustworthiness based upon the device-level fraud detection signals.

The device integrity system 170, after determining the level of trustworthiness of the client device, generates a respective device integrity token for each received public key. Each device integrity token includes the trustworthiness verdict, a timestamp for the verdict of trustworthiness, and one of the N public keys of the client device 110. The timestamp indicates the time at which the device integrity token was generated. In some implementations, the device integrity token can also include the identity of the device integrity systems 170, if the implementation supports multiple device integrity systems 170. The device integrity system 170 can generate a digital signature of the components of the device integrity token (e.g., the trustworthiness verdict, the public key of the client device 110, and the timestamp) using a private key of the device integrity system 170 and transmits device integrity token and the digital signature to the client device 110.

The client device 110 after receiving the N integrity tokens from the device integrity system 110 can store the device integrity tokens locally, e.g., in a cache or secure storage 115 maintained by the trusted program 114. Each cached device integrity token can include, for example: (1) the verdict of trustworthiness as determined by the device integrity system 170, (2) a timestamp for the creation of the device integrity token, (3) a public key of the client device, and (4) a digital signature of the components of the token, signed using the private key of the device integrity system 170. Having obtained the N device integrity tokens, the client device 110 can use the device integrity tokens to assemble and send attestation tokens as part of request for digital components to the content platforms 150 and/or other communications or requests that are susceptible to falsification (e.g., various types of notifications as described below).

In the process of generating a request for digital components 120, the trusted program 114 of the client device 110 can retrieve a device integrity token from the secure storage 115 of the client device 110. To generate a request for digital components, the trusted program 114 can generate a first attestation token 122 that can include a set content. The set of content can include (1) a public key 113 of the client device 110, (2) a token creation time that indicates a time at which the attestation token 122 is created, (3) a payload data, and (4) a device integrity token that is generated by the device integrity system 170. The first attestation token 122 also includes a digital signature generated based on the set of content of the first attestation token 122 using the private key 112 corresponding to the public key 113 of the retrieved device integrity token.

The payload data of the first attestation token can include data that can be used to select digital components. For example, the payload can include data related to the resource 145 that has the digital component slot (e.g., the resource itself or a URL for the resource 145), information about the resource 145 (e.g., topic of the resource), information about the digital component slot (e.g., the number of slots, the type of slots, the size of the slots, etc.), information about the client device 110 (e.g., type of device, IP address of the device, geographic location of the client device 110) if the user has enabled this feature, and/or other appropriate information.

The client device 110 can include an attestation token 122 (also referred to as a first attestation token 122) in the digital component request 120 sent to the content platform 150 or other recipients. In another example, the first attestation token 122 can serve as the request. The content platform 150, after receiving the request 120, validates the first attestation token 122 and/or the device integrity token included in the attestation token 122 (if appropriate). If the first attestation token 122 is successfully validated, the recipient can determine whether the client device 110 is a trusted device and process the request accordingly. If the first attestation token 122 is not successfully validated, the recipient can ignore or delete the request 120, e.g., without responding to the request 120.

The first attestation token 122 can include a token creation timestamp that indicates a time at which the attestation token 122 was created. The trusted program 114 can record the creation time when the trusted program 114 creates the first attestation token 122. This token creation timestamp can be a high resolution timestamp (e.g., accurate to the second, to the millisecond, or to the microsecond). The token creation timestamp of the first attestation token 122 can be used to determine whether a request 120 that includes the attestation token 122 is a new or recent request. For example, the content platform 150 after receiving the digital component request 120 that includes the first attestation token 122, can compare the token creation time to a current time or a time at which the first attestation token 122 was received. If the difference between the two times exceeds a threshold, the content platform 150 can determine that the request is not new, or invalid, as described in more detail below.

The token creation timestamp of the first attestation token 122 can also be used to detect replay attacks. For example, if multiple requests having the same set of data, including the same token creation timestamp are received, the entity that receives the requests can determine that the requests are duplicates and/or that the requests are part of a replay attack.

After validating the request 120 and the integrity of the client device 110, the content platform 150 can select digital components based on the payload data of the request 120. In some implementations, the content platform 150 can generate a hash value of the first attestation token 122 (or the contents of the request for digital component 120 in case the request is of the form of an attestation token) and include the hash value along with the selected digital component in the response transmitted to the client device 110. A hash value is a numeric value generated using a hash function (e.g., MD5, SHA-256, or another appropriate hash function) that uniquely identifies data.

After receiving the digital component as a response from the content platform 150, the client device 110 can optionally verify that the digital component is in fact selected and delivered to the client device 110 in response to the request for digital component 120. To verify, the client device 110 generates a hash value of the first attestation token that was included in the request 120. The client device 110 compares the generated hash value to the hash value that was received with the digital component 129. If the hash values are identical, the client device 110 can conclude that the digital component 129 was received in response to the request for digital component 120. The digital component 129 is displayed by the application 111 of the client device 110. If the hash values are not identical, the client device 110 does not display the digital component 129 and discards it.

In some implementations, after displaying the digital component 129, the client device 110 can notify the content platform 150 that the digital component 129 was displayed. The client device 110 can generate a display notification 123 that can include a second attestation token 124. Similar to the generation of the first attestation token 122, the trusted program 114 of the client device 110 can retrieve the same device integrity token (or a different device integrity token, e.g., if there is a newer one received from the device integrity system 170) from the secure storage 115 of the client device 110. The trusted program 114 can generate a second attestation token 124 that can include a set content that includes (1) a public key 113 of the client device 110, (2) a token creation time that indicates a time at which the second attestation token 124 is created, (3) payload data that includes notification data indicating that the digital component was displayed on the client device, and (4) a device integrity token that is generated by the device integrity system 170. The second attestation token 124 also includes a digital signature generated based on the set of content of the second attestation token 124 using the private key 112 corresponding to the public key 113 of the client device 110 included in the retrieved device integrity token.

In some implementations, the digital component 129 can include content that can reference an application 176 (also referred to as a second application) published by the application server 175. For example, the digital component 129 can be related to a video streaming service. In this example, the digital component 129 can include content identifying an application server 175 and an application of the video streaming service published by the application server 175. The user of the client device 110 after being exposed to the digital component 129 presented by the application 111 of the client device 110, may interact with (e.g., pressing a finger and/or a stylus on the touch sensitive screen of the client device 110) the digital component 129 and get redirected to the application server 175 via an URL and/or to application store of the client device 110 that manages the install of applications on the client device 110. The URL can be generated by the client device 110 using the content of the digital component 129 and/or extracted from the content of the digital component 129. The URL can include placeholders, which can be replaced by the client device 110 with corresponding attestation tokens, or hash of attestation tokens. The user can then download and/or install the referenced application 176 on the client device 110. For example, the user can download the application of the video streaming service.

In some implementations, in response to the user interaction with the digital component 129, the client device 129 can notify the content platform 150 that provided the digital component 129 by transmitting an interaction notification 125 to the content platform 150. To notify the content platform 150 about the user interaction, the client device 110 can generate a third attestation token 126 by retrieving a device integrity token (e.g., the same one as the first and second attestation tokens) from the secure storage 115 of the client device 110. The trusted program 114 can generate a third attestation token 126 that can include a set content that includes (1) a public key 113 of the client device 110, (2) a token creation time that indicates a time at which the third attestation token 126 is created, (3) payload data including notification data indicating that the digital component was interacted with on the client device, and (4) a device integrity token that is generated by the device integrity system 170. The third attestation token 126 also includes a digital signature generated based on the set of content of the third attestation token 126 using the private key 112 corresponding to the public key 113 of the client device 110 included in the retrieved device integrity token.

In some implementations, the interaction notification, which can be in the form of a URL for generating an HTTP request, can include the hash values of the attestation tokens (e.g., 122, 124 and 126) that were transmitted to the content platform 150 via different requests and notifications. The hash values of the tokens can be generated by the trusted program 114 of the client device 110 using a hash function, e.g., a hash function that is predetermined by the party that implements the attestation token system. For example, the interaction notification can include in parts (1) a pointer (or a reference) to the application 176 on the application server 175, (2) the hash value of the first attestation token 122, (3) the hash value of the second attestation token 124, and (4) the hash value of the third attestation token 126. In some implementations, the pointer and hash values can be part of the payload data of the third attestation token 126. In such implementations, the digital signature in the third attestation token 126 protects the data integrity of the third attestation token 126, which encodes the causality chain started with request 120, to display notification 123, and to interaction notification 125. The interaction notification can be sent to the content platform 150 and/or to the application server 175/

The application server 175 stores the hash values of the tokens that were included in the interaction notification. For example, the application server 175 can store an application download data set (also referred to as a first data set) that includes (1) an application identifier of the application 176 within the domain of the application server 175, (2) the hash value of the first attestation token 122, (3) the hash value of the second attestation token 124, and (4) the hash value of the third attestation token 126. The application server 175 can also provide each application download data set to the attribution processing apparatus 180.

In some implementation, the content platform 150 in order to be attributed for the user action of interacting with the digital component 129 or downloading (or installing) the application 126 referenced by the digital component 129, can generate a request for attribution 162. To generate the request for attribution 162, the content platform 150 can generate respective hash values of the attestation tokens received from the client device 110. In some implementations, to prevent other malicious entity to wrongfully claim attribution for the download of the application, the content platform 150 can include, in the request for attribution 162, an attribution data set (also referred to as a second set of data) that includes (1) the hash value of the first attestation token 122 that was included in the request for digital component 120, (2) the hash value of the second attestation token 124 that was included in the display notification 123, and (3) the hash value of the third attestation token 126 that was included in the interaction notification 125. In some implementations, the attribution data set may include first attestation token 122, the second attestation token 124, and the third attestation token 126, instead of, or in addition to, their respective hash values. After generating the request for attribution 162, the request is transmitted to an attribution processing apparatus 180.

The attribution processing apparatus 180 can be an independent entity that includes a technology platform implemented in hardware and/or software that automates the process of attributing content platforms 150 for providing digital components that result in the download and/or installation of applications. When the attribution processing apparatus 180 receives an application download data set from the application server 175, the attribution processing apparatus 180 can store the application download data set for later attribution to a content platform that provided the digital component that led to the download and/or installation of the application corresponding to the set of data. That is, the attribution processing apparatus 180 can attribute the download and/or installation of the application to the content platform 150 that can provide a set of data (e.g., attribution data set) that includes a set of hash values (or attestation tokens for which hash values generated by the application processing apparatus 180) that match the hash values of the application download data set for the download/installation of the application. The attribution can be in the form of a credit to the content platform 150 and/or content provider 160, e.g., a monetary or non-monetary credit.

After receiving the attribution data set from the content platform 150, the attribution processing apparatus 180 compares the content of the attribution data set to one or more application download data sets. If the attribution data set includes an application identifier for the application or an install identifier for the installation of the application, the attribution processing apparatus 180 can identify the appropriate application download data set that also has that application or install identifier. If there are no identifiers, the attribution data processing apparatus 180 can compare the hash values of the attribution data set with each application download data set. If each pair of hash values match between the hash values of the attribution data set and an application download data set, the attribution processing apparatus 180 can verify that the content platform 150 that provided the attribution data set is the content platform 150 that provided the digital component that resulted in the download of the application corresponding to the application download data set.

This comparison between the content of the attribution data set and an application download data set can include comparing the hash value of the first attestation token 122 of the attribution data set to a hash value of an attestation token for a digital component request of the application download data set. This comparison can also include comparing the hash value of the second attestation token 124 of the attribution data set to a hash value of an attestation token for reporting a digital component impression of the application download data set. This comparison can also include comparing the hash value of the third attestation token 126 of the attribution data set to a hash value of an attestation token for reporting a user interaction with the digital component of the application download data set. If all three pairs match, the attribution processing apparatus 180 can determine that the first data set matches the application download data set and therefore the attribution processing apparatus 180 attributes the download of the application to the content platform.

If the hash values of the individual tokens of the first set and the application download data are identical, the attribution processing apparatus 180 can conclude that the events that led to the display of the digital component 129 on the client device 110, the subsequent user interaction with the digital component 129 and downloading and/or installing the application 126 from the application server 175 were performed by intended parties (i.e., the client device 110, the content platform 150 and the application server 175) without any interference and/or impersonation by an un-intended and/or malicious entity.

Figure 2:
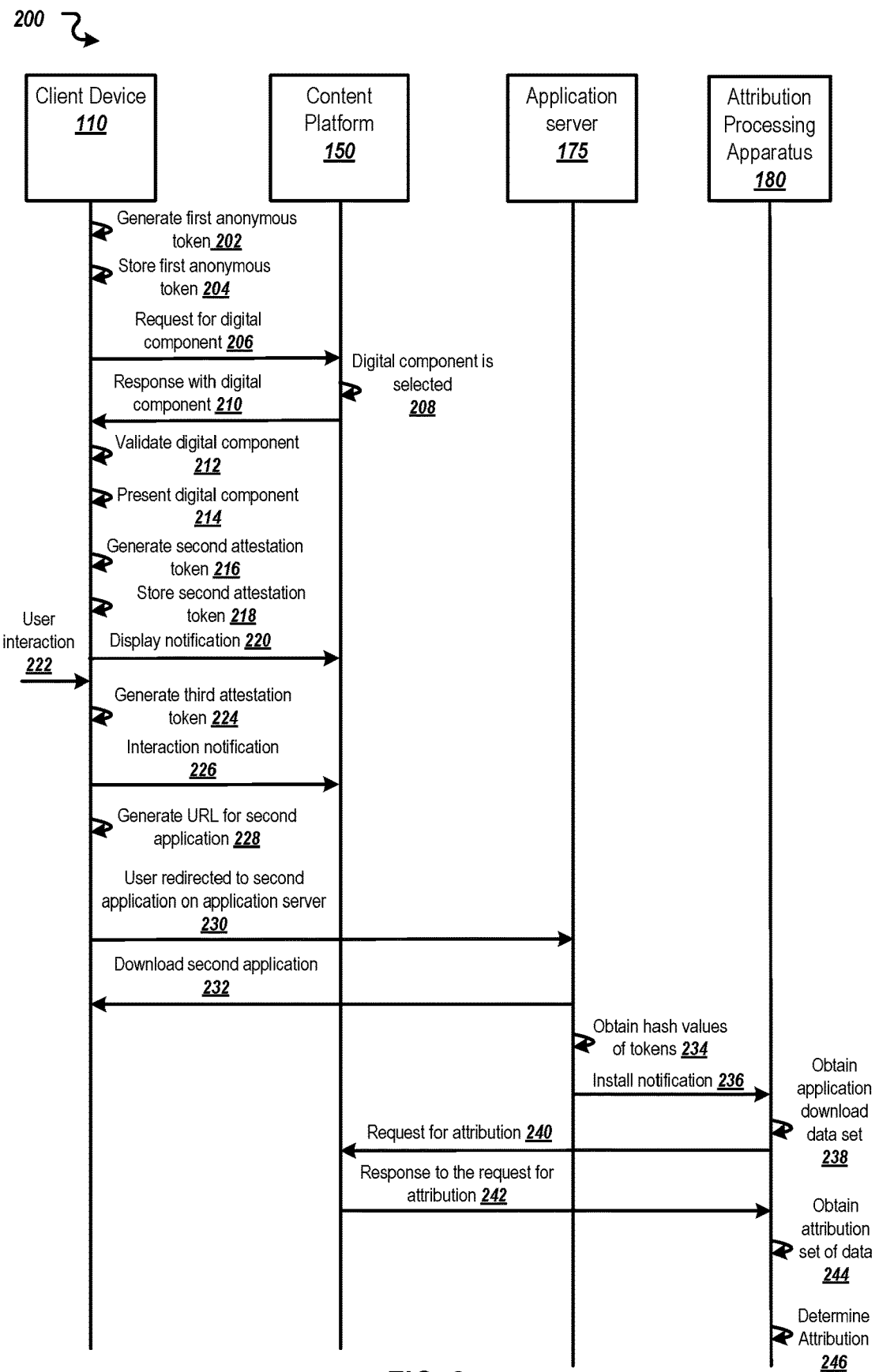
FIG. 2 is a swim lane diagram that illustrates an example process for attributing a content platform for the download of an application.

FIG. 2 is a swim lane diagram that illustrates an example process 200 for attributing a content platform 150 for the user action of downloading and/or installing an application. A similar process can be used for other user actions. Operations of the process 200 can be implemented for example, by the client device 110, a content platform 150, an attribution processing apparatus 180 and an application server 175. Operations of the process 200 can also be implemented as instructions stored on one or more computer readable media which may be non-transitory, and execution of the instructions by one or more data processing apparatus can cause the one or more data processing apparatus to perform the operations of the process 200.

In the example process 200, the client device 110 can store N integrity tokens previously received from the device integrity system 170. The client device 110 can store the device integrity tokens locally, e.g., in a cache or secure storage 115 maintained by the trusted program 114. Each cached device integrity token can include, for example, (1) the verdict of trustworthiness as determined by the device integrity system 170, (2) a timestamp for the creation of the device integrity token, (3) a public key of the client device, and (4) a digital signature of the other components of the token, signed using the private key 112 of the device integrity system 170. If multiple device integrity systems 170 are supported, each device integrity token can include data identifying the device integrity system 170 that generates the device integrity token. The application 111 of the client device 110 can load a resource 145 or application content (which is another form of a resource) that includes a digital component slot. For example, the application 111 such as a web browser executing on the client device 100 can request a digital component for the slot from the content platform 150.

The client device 110 generates a first attestation token (202). For example, an application 111, e.g., web browser, that is going to request a digital component can request an attestation token from a trusted program 114, e.g., operating system, of the client device 110. In another example, a digital component software development kit (SDK) can request the attestation token from the trusted program 114 on behalf of the application 111.

The trusted program 114 can retrieve a device integrity token from the secure storage 115 of the client device 110. The trusted program 114 can generate the first attestation token 122 that can include a set content that includes (1) a public key 113 of the client device 110, (2) a token creation timestamp that indicates a time at which the first attestation token 122 is created, (3) payload data, and (4) a device integrity token that is generated by the device integrity system 170. The first attestation token 122 also includes a digital signature generated based on the set of content of the first attestation token 122 using the private key 112 corresponding to the public key 113 of the client device 110 that is included in the retrieved device integrity token.

The client device 110 stores the first attestation token (204). For example, the trusted program 114 of the client device 110 after generating the first attestation token 122 can store the first attestation token 122 in a secure storage 115 (or a secure cache memory) of the client device 110. For example, the operating system of the client device 110 can store the first attestation token 122 or a hash value generated using the first attestation token and a hash function. The client device 110 can store the first attestation token for a specified time duration. This time duration can be based on the amount of time expected to elapse between the time the digital component is requested and the time a second attestation token is generated for the display of the digital component. Once the specified duration lapses, the trusted program 114 can delete the first attestation token.

The client device 110 transmits the request for digital component to a content platform 150 (206). The client device 110 can generate a digital component request 120 in the form of the first attestation token 122 or generate the first attestation token 122 and include the first attestation token 122 in the request 120. In either of the techniques of generating a digital component request 120, the request 120 can include a payload data section in addition to a public key 113 of the client device 110, a token creation time that indicates a time at which the first attestation token 122 is created, a device integrity token that is generated by the device integrity system 170, and a digital signature of the set of content of the attestation token 122 using the private key 112 corresponding to the public key 113 of the device integrity token.

The payload section can include data that can be used to select a digital component. For example, the payload can include the resource 145 that has the digital component slot (or a URL for the resource 145), information about the resource 145 (e.g., topic of the resource), information about the digital component slot (e.g., the number of slots, the type of slots, the size of the slots, etc.), information about the client device 110 (e.g., type of device, IP address of the device, geographic location of the client device 110) if the user has enabled this feature, and/or other appropriate information.

The client device 110 can then transmit the digital component request 120 to the content platform 150 over the network 105. The digital component request 120 can be transmitted, for example, over a packetized network 105, and the component requests themselves can be formatted as packetized data having a header and payload data. The header can specify a destination of the packet and the payload data can include any of the information discussed above.

The content platform 150 selects a digital component (208). After receiving the request for digital components 120, the content platform 150 can validate the request by verifying the first attestation token 122 that was included in the request 120. For example, the content platform 150 can attempt to verify the digital signature of the set of content of the first attestation token 122 using the public key 113 includes in the first attestation token 122. This verification can be used to determine whether the set of content of the first attestation token 122, e.g., the payload data, the timestamp, the public key 113, and the device integrity token have changed during transmission. If any of the content changed after the digital signature was generated, the verification of the digital signature would fail. For example, if a malicious party inserted the device integrity token into another request or inserted a different device integrity token that had a higher verdict of trustworthiness into the request, the signature verification would fail. This ensures that the content of the request 120 was not changed during transmission of the request, e.g., by an intermediary.

The content platform 150 can validate the device integrity token of the first attestation token 122 by verifying the signature of the device integrity token using the public key of the device integrity system 170. This similarly ensures that the content of the device integrity token has not changed since the device integrity token was issued by the device integrity token system 170. The content platform 150 validates the timeliness and trustworthiness of the client device 110, e.g. to confirm that the device integrity token was recently created (i.e. not created more than a selected interval of time such as H hours or D days before the time when the request was made, for H, D=1, 2, 3, . . . ) and to confirm that the trustworthiness verdict in the device integrity token is a verdict sufficient to honor the request. If any of the validity checks fail, the content platform 150 can ignore the request. For example, the content platform 150 may not respond to the request if any of the validity checks fail. After validating the request 120 and the content of the request 120, the content platform 150 can interact with one or more other content platforms 150 such as DSPs (or content providers) and select a digital component based on the payload data of the request for digital components 120.

In some implementations, the selected digital component 129 can include a unique identifier (referred to as a digital component identifier) that can uniquely identify the digital component 129 among the multiple digital components in the eTLD+1 domain of the DSP or the content provider 160. The digital component identifier can also identify the content platform 150 or the content provider 160 that actually provided the digital component 129 to the content platform 150. In some implementations, the digital component identifier can be generated and assigned by the content platform 150 such as the SSP.

The content platform 150 transmits digital component to the client device 110 (210). For example, the content platform 150 after selecting the digital component, transmits the digital component 129 (or the data for the digital component 129 that can include a link to download the digital component) as a response to the request 120 for digital component to the application 111. Prior to transmitting the digital component 129, the content platform 150 generates a hash value of the first attestation token 122 using a predetermined hash function such as a MD5 or SHA256 and includes it in the response. In some situations, a hash function is selected from among multiple hash functions available to the content platform 150 (and the client device 110). In such situations, the content platform 150 can also include an identifier of the hash function in the response that can be used by a recipient computing system (here client device 110) to identify the hash function that was used to generate the hash value by the content platform 150. To prevent intermediaries from swapping the hash value, the content platform 150 can digitally sign the combination of data included in the response using a private key of the content platform 150 such that the recipient can verify the signature using a corresponding public key of the content platform 150 and the received data of the response.

In some implementations, the content platform 150 can include the digital component identifier in the response to allow the content platform 150 to uniquely identify the digital component 129 and the corresponding DSP or the content provider 160 that provided the digital component.

The client device 110 optionally validates the digital component (212). For example, the client device 110 can verify that the digital component 129 is in fact selected and delivered to the client device 110 as a response to the request 120 for digital component. To verify, the client device 110 generates a hash value of the first attestation token 122 (if not already generated and stored in the secure storage 115) that was included in the request for digital component 120 and stored in the secure storage 115. After generating the hash value of the first attestation token 122, the client device 110 compares the generated hash value to the hash value of the first attestation token that was received as a response from the content platform 150 along with the digital component 129. If the hash values are identical and the digital signature of the response is verified successfully, the client device 110 can conclude that the digital component 129 was received in response to the digital component request 120. If the hash values are not identical, the client device 110 discards the digital component 129.

This verification prevents fraud that may occur if a malicious digital component, application, malicious intermediaries, or digital component SDK of the client device 110 passes the hash value of any token (e.g., received from another device) to the trusted program 114 that generates the attestation token. That is, this verification ensures that the digital component was provided in response to the digital component request that the client device 110 sent to the content platform 150.

The application 111 presents the digital component (214). For example, application 111 can display the digital component 129 with the electronic resource of the publisher 140.

The client device 110 generates a second attestation token (216) for reporting the display of the digital component. After displaying the digital component 129 on the client device 110, the application 111 can notify the content platform 150 indicating that the digital component 129 was displayed on the client device 110. To notify the content platform 150, the client device 110 can generate a display notification 123 that can either be in the form of an attestation token 124 or an attestation token 124 can be included in the display notification 123.

Similar to the step 202 of the process 200, the application 111 or the digital component SDK can request that the trusted program 114 generate an attestation token. The trusted program 114 can retrieve a device integrity token from the secure storage 115 of the client device 110. The trusted program 114 can generate the second attestation token 124 that can include a set content that includes (1) a public key 113 of the client device 110, (2) a token creation time that indicates a time at which the attestation token 126 is created, (3) a payload data, and (4) a device integrity token that is generated by the device integrity system 170. The second attestation token 124 also includes a digital signature generated based on the set of content of the second attestation token 124 using the private key 112 corresponding to the public key 113 of the client device 110 that is included in the retrieved device integrity token.

In some implementations, the payload data of the second attestation token 124 (or the display notification 123) can include a digital component identifier of the digital component 129. For example, after verifying and displaying the digital component 129, the payload section of the second attestation token 124 can include the digital component identifier indicating to the content platform 150 that the digital component 129 identified by the unique identifier was displayed on the client device 110. In another example, the hash value of the first attestation token 122 can be included in addition to, or in place of, the digital component identifier for the same purpose.

The request for the second attestation token can include the hash value of the first attestation token. To verify that the display notification corresponds to the request for the digital component, the trusted program 114 compares the hash value of the first attestation token received with the request to the hash value for the first attestation token stored by the trusted program 114, as described above. If they match, the trusted program 114 generates the second attestation token. If the hash values do not match, the trusted program 114 can ignore the request or generate a fraud alert.

The client device 110 stores the second attestation token (218). For example, the trusted program 114 of the client device 110 after generating the second attestation token 124 can store the second attestation token 124 in a secure storage 115 (or a secure cache memory) of the client device 110. The trusted program 114 can store the second attestation token 124 or a hash value generated using the second attestation token in the secure storage 115 for a specified time duration that is based on an expected amount of time between the display of the digital component and user interaction with the digital component. After this time duration lapses, the trusted program 114 can delete the second attestation token or hash value.

The client device 110 transmits the display notification to the content platform 150 (220). For example, the client device 110 after displaying the digital component, transmits the display notification 218 to the content platform 150 over the network 105.

The user of the client device interacts with the digital component (222). For example, the user of the client device 110 after being exposed to a digital component 129 displayed by the application 111, can interact with (e.g., pressing his/her finger and/or a stylus on the touch sensitive screen of the client device) the digital component 129.

The client device 110 generates a third attestation token (224). In response to the user interaction with the digital component 129 on the client device 110, the application 111 can notify the content platform 150 indicating that the digital component 129 was interacted with by the user of the client device 110. To notify the content platform 150 about the user interaction, the client device 110 can generate an interaction notification 125 that can either be of the form of an attestation token 126 or an attestation token 126 can be included in the interaction notification 125.

Similar to the step 202 and 216 of the process 200, the application or digital component SDK can request an attestation token from the trusted program 114. The trusted program 114 can retrieve a device integrity token from the secure storage 115 of the client device 110. The trusted program 114 can generate a third attestation token 126 that can include a set content that further includes (1) a public key 113 of the client device 110, (2) a token creation time that indicates a time at which the attestation token 126 is created, (3) a payload data, (4) a device integrity token that is generated by the device integrity system 170. The third attestation token 126 also includes a digital signature generated based on the set of content of the third attestation token 126 using the private key 112 corresponding to the public key 113 of the retrieved device integrity token.

In some implementations, the payload data of the third attestation token 126 can include the digital component identifier of the digital component 129, indicating to the content platform 150, the digital component 129 that was interacted with by the user of the client device 110. In another example, the payload data can include the hash value of the second attestation token in addition to, or in place of, the digital component identifier.

The request for the third attestation token can include the hash value of the second attestation token. To verify that the display notification corresponds to the request for the digital component, the trusted program 114 compares the hash value of the second attestation token received with the request to the hash value for the second attestation token stored by the trusted program 114. If they match, the trusted program 114 generates the third attestation token. If the hash values do not match, the trusted program 114 can ignore the request or generate a fraud alert.

The client device 110 transmits the interaction notification to the content platform 150 (226). For example, the client device 110 can transmit the interaction notification 125 to the content platform 150 over the network 105.

The client device 110 generates a URL for downloading a second application (228). For example, if the user interacts with the digital component 129 that includes data that refers to a second application such as an application 176 published by the application server 175, the application 111 of the client device 110 (or an application store of the client device 110) can be redirected to the application server 175 from where the user can download and/or install the application 176 on the client device 110. For example, the user after getting exposed to a digital component regarding a video streaming service, can interact with the digital component to download and install an application of the video streaming service.

To redirect the application 111 of the client device 110 to the application server 175, the client device 110 can generate a URL based on the contents of the digital component 129. For example, the digital component 129 can include the eTLD+1 domain of the application server 175 and an application identifier of the application 176 that identifies the application 176 from among the multiple applications published by the application server 175. In such implementations, URL generated by the client device 110 can include the eTLD+1 domain of the application server 175 and the application identifier.

In some implementations, the URL generated by the client device 110 can include in parts the hash values of the attestation tokens (e.g., 122, 124 and 126) that were transmitted to the content platform 150 via request 120 and notifications 123 and 125. The hash values of the tokens can be generated by the trusted program 114 of the client device 110 using a hash function that can be predetermined by the client device 110 and the content provider 160. For example, the URL can include the hash value of the first attestation token 122, the hash value of the second attestation token 124, and the hash value of the third attestation token 126. In some implementations, the URL generated by the client device 110 can also include the digital component identifier of the digital component 129.

The client device 110 redirects the application 111 (or application store) to the application server 175 (230). For example, the application 111 executing on the client device 110 redirects to the application server 175 using the URL generated by the client device 110.

The client device 110 downloads the second application from the application server 175 (232). For example, the user of the client device 110 downloads the second application (e.g., the application 176) or data including computer executable code that when executed on the client device 110 can install the second application on the client device 110.

The application server 175 obtains the hash values included in the URL (234). For example, the application server 175 when being accessed by the client device 110 (after being redirected via the URL), stores the hash values of the tokens that were included in the URL. For example, the application server 175 can store the (1) the application identifier of the application 176 within the eTLD+1 domain of the application server 175, (2) the hash value of the first attestation token 122, (3) the hash value of the second attestation token 124, and (4) the hash value of the third attestation token 126. In some implementations, the application server 175 can also store the digital component identifier of the digital component 129.

The application server 175 (or the client device 110) transmits an install notification to the attribution processing apparatus 180 (236). For example, the application server 175 can notify the attribution processing apparatus 180 regarding the downloading of the second application (application 176) onto the client device 110 after being accessed by the client device 110 using an install notification. In another example, the client device 110 can send the install notification, e.g., in the form of a fourth attestation token that has the same structure as other attestation tokens described in this document, but with the following payload data. In some implementations, the install notification can include an application download data set (which can be the payload data of the fourth attestation token) that includes the hash value of the first attestation token 122, the hash value of the second attestation token 124 and the hash value of the third attestation token 126. Note that the hash values of the attestation tokens 122, 124 and 126 of the application download data set were obtained by the application server 175 from the client device 110 via the URL generated from the contents of the digital component 129. Also note that the hash values of the attestation tokens 122, 124 and 126 of the application download data set were generated by the trusted program 114 of the client device 110. In some implementations, the install notification can also include the digital component identifier of the digital component 129.

The attribution processing apparatus 180 obtains the application download data set (238). For example, after receiving the install notification indicating that the second application (e.g., application 176) was downloaded and/or installed on the client device 110, the application server 175 can provide, to the attribution processing apparatus 180, the application download data set including the hash values of the first attestation token 122, the hash values of the second attestation token 124 and the hash values of the third attestation token 126. The attribution processing apparatus 180 can also store the digital component identifier of the digital component 129.

The attribution processing apparatus 180 transmits a request for attribution to the content platform 150 and optionally other content platforms that may have contributed to the install of the application at the client device (240). In some implementations, the attribution processing apparatus 180 can generate and transmit a request for attribution 162 to the one or more content platforms to check if the content platforms wants to request attribution for the user action of downloading the second application 176. In some implementations, the request for attribution 162 can be generated in response to the attribution processing apparatus 180 receiving the install notification. In other implementations, the attribution processing apparatus 180 can maintain a log of all the install notifications for a period of time and generate a request for attribution 162 for each of the install notifications after the period of time. The request for attribution 162 can include the digital component identifier that can indicate to the content platform 150, the digital component to which the attribution processing apparatus 180 is referring. For example, the attribution processing apparatus 180 transmits a request for attribution 162 to the content platform 150 that includes the digital component identifier of the digital component 129.

The content platform 150 responds to the request for attribution 162 (242). The content platform 150 in order to be attributed for the user action of downloading and/or installing the second application 176 referenced by the digital component 129 that is identified by the digital component identifier included in the request for attribution 162, can respond to the request for attribution 162. The content platform 150 can compute the hash values of the first attestation token 122, the second attestation token 124, and the third attestation token 126 that were received by the content platform 150 from the client device 110 for the digital component request 120, the display notification 123, and the install notification 125, respectively. After computing the hash values, the content platform 150 can include the hash values in the response as an attribution data set. In other words, the attribution data set includes a hash value of the first attestation token that was included in the request 120 for digital component, a hash value for the second attestation token that was included in the display notification 123, and a hash value of the third attestation token that was included in the interaction notification 125. In some implementations, the attribution data set can include these attestation tokens rather than, or in addition to, the hash values.

Prior to responding to the request for attribution 162, the content platform 150 can validate the second attestation token 124 and the third attestation token 126 to prevent other malicious entities from wrongfully interfering with the process for providing the digital component 129. For example, after receiving the display notification 123 that includes the attestation token 124, the content platform 150 can verify the digital signature using the device public key included in the request. The content platform 150 can attempt to verify the digital signature using the public key and the content of the request signed over by the client device 110, e.g., the payload data, the timestamp, the public key, and the device integrity token. If any of this content changed after the digital signature was generated, the verification would fail. For example, if a malicious party inserted the device integrity token into another request or inserted a different device integrity token that had a higher verdict of trustworthiness into the request, the signature verification would fail. This ensures that the content of the display notification 123 was not changed during transmission of the request, e.g., by an intermediary.

The content platform 150 can validate the device integrity token included in the attestation token 124 by verifying the signature of the device integrity token using the public key of the device integrity system 170. This similarly ensures that the content of the device integrity token has not changed since the device integrity token was issued by the device integrity token system 170. The content platform 150 validates the timeliness and trustworthiness of the client device 110, e.g., to confirm that the device integrity token was recently created (e.g., not created more than a selected interval of time such as H hours or D days before the time when the request was made, for H, D=1, 2, 3, . . . ) and to confirm that the trustworthiness verdict in the device integrity token is a verdict sufficient to honor the display notification. If any of the validity checks fail, the content platform 150 can ignore the display notification. Similarly, the content platform 150 can validate the second attestation token 124 included in the interaction notification 125 and the device integrity token included in the attestation token 124. Note that the attestation token 122 may have already been validated by the content platform 150 that was included in the digital component request 120 prior to transmitting the digital component 129.

In some implementations, the content platforms 150 or the content providers 160 can initiate the attribution process. For example, after receiving the install notification 125 from the client device 110, the content platform 150 can request the attribution processing apparatus 180 for attribution. In such implementations, the request can include the attribution data set including the hash values of the first attestation token 122, the second attestation token 124 and the third attestation token 126 that were received by the content platform 150 from the client device 110.

The attribution processing apparatus 180 obtains the attribution data set (244). For example, after receiving the response from the content platform 150, the attribution processing apparatus 180 can obtain and store the hash values of the attribution data set including the hash value of the first attestation token 122, the hash value of the second attestation token 124 and the hash value of the third attestation token 126. The attribution processing apparatus 180 can also store the digital component identifier of the digital component 129.

The attribution processing apparatus 180 determines attribution for the user action of downloading the second application (246). After receiving the application download data set and the attribution data set from the application server 175 and the content platform 150 respectively, the attribution processing apparatus 180 compares the contents of the two data sets to verify that the client device 110 accessed the application server 175 in response to an user interaction with a digital component 129 that was displayed on the client device 110. The attribution processing apparatus 180 can also verify that the digital component 129 displayed on the client device 110 was provided by a content platform 150 was indeed the actual provider of the digital component 129 and that the content platform 150 provided the digital component 129 in response to the request for digital component 120 transmitted by the client device 110.

For example, to verify that the digital component 129 that was provided to the client device 110 was selected and transmitted by the content platform 150 in response to the request 120 for digital component, the attribution processing apparatus 180 can compare the hash value of the first attestation token 122 of the attribution data set to a corresponding hash value of the application download data set, e.g., to a hash value of an attestation token received as part of a request for a digital component included in the application download data set. If the hash values are identical, it would mean that the digital component 129 was provided as a response to the request 120 for digital component that was transmitted by the client device 110 to the content platform 150.

Similarly, if the hash value of the second attestation token 124 of the attribution data set is identical to a corresponding hash value of the application download data set (e.g., to a hash value of an attestation token received as part of a digital component display notification), the attribution processing apparatus 180 can conclude that the digital component 129 that was transmitted by the content provider 160 was in fact displayed on the client device 110, since the second attestation token 124 was generated by the client device 110 only after verifying that the digital component 129 was provided by the content provider 160 in response to the request 120 for digital components.

Similarly, the attribution processing apparatus 180 in order to verify that the client device 110 accessed the application server 175 in response to a user interaction with a digital component 129, compares the hash value of the third attestation token 122 of the attribution data set and data corresponding hash value of the application download data set, e.g., to a hash value of an attestation token received as part of a digital component interaction notification. In other words, the attribution processing apparatus 180 compares the hash value of the attestation token of the interaction notification 125 computed by the client device 110 and the hash value computed by the content platform 150 after receiving the interaction notification 125. If the hash values are identical, the attribution processing apparatus 180 can conclude that the client device 110 accessed the application server 175 in response to a user interaction with the digital component 129 that was displayed on the client device 110.

To conclude, if the hash values of the individual tokens of the attribution data set and the application download data set match (e.g., are identical), the attribution processing apparatus 180 can conclude that the events that led to the display of the digital component 129 on the client device 110, the subsequent user interaction with the digital component 129 and the user action of downloading and/or installing the application 126 from the application server 175 were performed by intended parties (i.e., the client device 110, the content platform 150 and the application server 175) without any interference and/or impersonation by an unintended and/or malicious entity. The attribution processing apparatus 180 can also determine that the content platform 150 provided the digital component 129 to the client device 110 that led to the user action of downloading and/or installing the second application 176 on the client device and attribute the content platform 150.

Finally, the attribution processing apparatus 180 can determine the content platforms 150 including the SSP, the DSP and the content provider 160 using the digital component identifier and attribute each of the entities accordingly for the user action of downloading and/or installing the second application 176.

Figure 3:
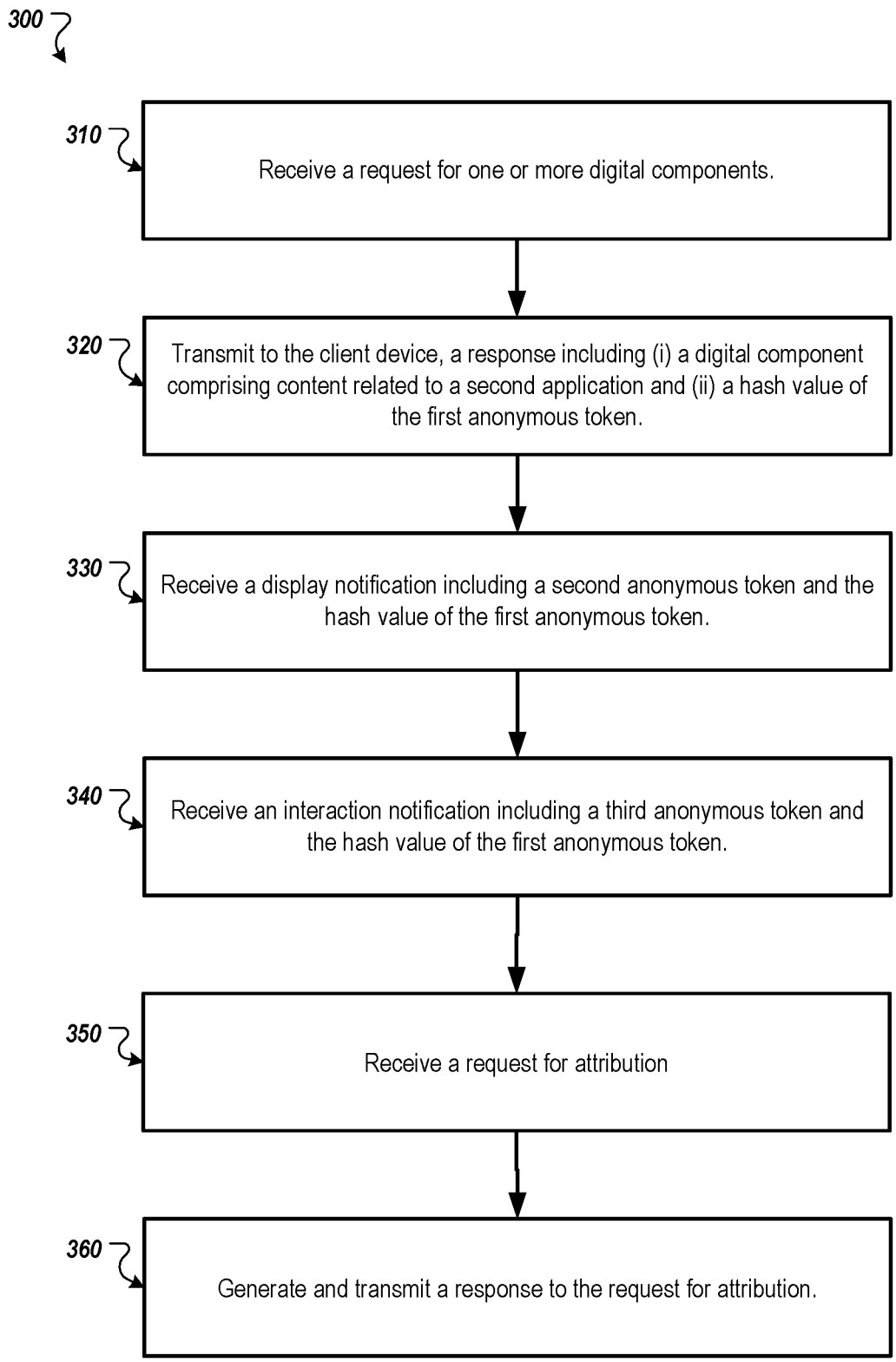
FIG. 3 is a flow diagram of an example process of requesting attribution for the user action of downloading an application.

FIG. 3 is a flow diagram of an example process 300 of requesting attribution for the user action of downloading a second application. Operations of process 300 are described below as being performed by a content platform 150. Operations of the process 300 are described below for illustration purposes only. Operations of the process 300 can be performed by any appropriate device or system, e.g., any appropriate data processing apparatus. Operations of the process 300 can also be implemented as instructions stored on a computer readable medium, which may be non-transitory. Execution of the instructions causes one or more data processing apparatus to perform operations of the process 300.

The content platform 150 receives a request for one or more digital component (310). For example, the application 111 such as a web browser executing on the client device 100 can generate a digital component request 120 to request a digital component from the content platform 150. The digital component request 120 can include a first attestation token 122 that can include a set content that includes (1) a public key 113 of the client device 110, (2) a token creation time that indicates a time at which the attestation token 126 is created, (3) a payload data, and (4) a device integrity token that is generated by the device integrity system 170. The first attestation token 124 also includes a digital signature generated based on the set of content of the first attestation token 122 using the private key 112 corresponding to the public key 113 included in the retrieved device integrity token. The payload data can include data that can be used to select digital components.

The client device 110 can then transmit the digital component request 120 to a computing system of the content platform 150. In the particular example, the application 111 such as a web browser generates the digital component request 120 and transmits the request 120 to the content platform 150 over the network 105.

The content platform 150 transmits a response to the client device 110 (320). For example, the content platform 150 after receiving the request 120, can validate the request 120 by verifying the first attestation token 122 that was included in the request 120. For example, the content platform 150 can attempt to verify the digital signature of the set of content of the first attestation token 122 and determine the set of content of the attestation token 122, e.g., the payload data, the timestamp, the public key, and the device integrity token have not changed during transmission. If any of the contents changed after the digital signature was generated, the verification would fail.

The content platform 150 can validate the device integrity token of the first attestation token 122 by verifying the signature of the device integrity token using the public key of the device integrity system 170. The content platform 150 validates the timeliness and trustworthiness of the client device 110, e.g., to confirm that the device integrity token was recently created (i.e. not created more than a selected interval of time such as H hours or D days before the time when the request was made, for H, D=1, 2, 3, . . . ) and to confirm that the trustworthiness verdict in the device integrity token is a verdict sufficient to honor the request. If any of the validity checks fail, the content platform 150 can ignore the request. For example, the content platform 150 may not respond to the request if any of the validity checks fail.

After validating the request 120 and the content of the request 120, the content platform 150 can interact with one or more other content platforms 150 such as DSPs (or content providers 160) and select a digital component based on the payload data of the request for digital components 120. The selected digital component 129 can include a unique identifier (referred to as a digital component identifier) that can uniquely identify the digital component 129 among the multiple digital components in the eTLD+1 domain of the DSP or the content provider 160. The digital component identifier can also identify the DSP or the content provider that actually provided the digital component 129 to the content platform 150.

The content platform 150 after selecting the digital component, transmits the digital component 129 (or the data for the digital component 129) as a response to the request 120 for digital component to the application 111. Prior to transmitting the digital component 129, the content platform 150 generates a hash value of the first attestation token 122 using a predetermined hash function such as a SHA256hash function and includes the hash value in the response. The content platform 150 when transmitting the digital component 129 to the client device 110, can include the digital component identifier in the response to allow the content platform 150 to uniquely identify the digital component 129 and the corresponding DSP or the content provider 160 that provided the digital component.

The content platform 150 receives a display notification (330). For example, after displaying the digital component 129 on the client device 110, the application 111 can notify the content platform 150 indicating that the digital component 129 was displayed on the client device 110 by transmitting a display notification 123 to the content platform 150. The display notification 123 can include the second attestation token 124 that can include a set content that further includes (1) a public key 113 of the client device 110, (2) a token creation time that indicates a time at which the attestation token 126 is created, (3) a payload data, (4) a device integrity token that is generated by the device integrity system 170. The second attestation token 124 also includes a digital signature generated based on the set of content of the second attestation token 124 using the private key 112 corresponding to the public key 113 included in the retrieved device integrity token. The payload data of the second attestation token 124 can also include the hash value of the first attestation token 122 and/or a unique digital component identifier of the digital component 129.

The content platform 150 receives an interaction notification (340). For example, in response to the user interaction with the digital component 129 on the client device 110, the application 111 can notify the content platform 150 indicating that the digital component 129 was interacted with by the user of the client device 110. To notify the content platform 150 about the user interaction, the client device 110 can generate an interaction notification 125 that can include a third attestation token 126. The third attestation token 126 can include a set content that further includes (1) a public key 113 of the client device 110, (2) a token creation time that indicates a time at which the attestation token 126 is created, (3) a payload data, (4) a device integrity token that is generated by the device integrity system 170. The third attestation token 126 also includes a digital signature generated based on the set of content of the third attestation token 126 using the private key 112 corresponding to the public key 113 included in the retrieved device integrity token. The payload data of the third attestation token 126 can also include a hash value of the second attestation token and/or the digital component identifier of the digital component 129.

If the user interacts with the digital component 129 that includes data that refers to a second application such as an application 176 published by the application server 175, the application 111 of the client device 110 (or application store) can be redirected to the application server 175 from where the user can download and/or install the application 176 on the client device 110. For example, the user after getting exposed to a digital component regarding a video streaming service, can interact with the digital component to download and install an application of the video streaming service.

To redirect the application 111 of the client device 110 to the application server 175, the client device 110 can generate a URL based on the contents of the digital component 129. For example, the digital component 129 can include the eTLD+1 domain of the application server 175 and an application identifier of the application 176 that identifies the application 176 from among the multiple applications published by the application server 175. In such implementations, URL generated by the client device 110 can include the eTLD+1 domain of the application server 175 and the application identifier.

In some implementations, the URL generated by the client device 110 can include in parts the hash values of the attestation tokens e.g., 122, 124 and 126 that were transmitted to the content platform 150 via request 120 for digital component, the display notifications 123 and the interaction notification 125. The hash values of the tokens can be generated by the trusted program 114 of the client device 110 using a hash function that can be predetermined by the client device 110 and the content provider 160.

The application 111 executing on the client device 110 redirects to the application server 175 using the URL generated by the client device 110. The user of the client device 110 downloads the second application (e.g., the application 176) or data including computer executable code that when executed on the client device 110 can install the second application on the client device 110. The application server 175 obtains the hash values included in the URL. For example, the application server 175 when being accessed by the client device 110 (after being redirected via the URL), stores the hash values of the tokens that were included in the URL. For example, the application server 175 can store the (1) the application identifier of the application 176 within the eTLD+1 domain of the application server 175, (2) the hash value of the first attestation token 122, (3) the hash value of the second attestation token 124, and (4) the hash value of the third attestation token 126. In some implementations, the application server 175 can also store the digital component identifier of the digital component 129.

The application server 175 transmits an install notification to the attribution processing apparatus 180. For example, the application server 175 can notify the attribution processing apparatus 180 regarding the downloading of the second application (application 176) on to the client device 110 after being accessed by the client device 110 using an install notification. In some implementations, the install notification can include an application download data set (e.g., first set of data) that includes the hash values of the first attestation token 122, the hash values of the second attestation token 124 and the hash values of the third attestation token 126. Note that the hash values of the attestation tokens 122, 124 and 126 of the application download data set were obtained by the application server 175 from the client device 110 via the URL generated from the contents of the digital component 129. Also note that the hash values of the attestation tokens 122, 124 and 126 of the application download data set were generated by the trusted program 114 of the client device 110. In some implementations, the install notification can also include the digital component identifier of the digital component 129.

The attribution processing apparatus 180 obtains the application download data set For example, after receiving the install notification indicating that the second application (e.g., application 176) was downloaded and/or installed on the client device 110, the attribution processing apparatus 180 can obtain and store the contents of the application download data set including the hash values of the first attestation token 122, the hash values of the second attestation token 124 and the hash values of the third attestation token 126. The attribution processing apparatus 180 can also store the digital component identifier of the digital component 129.

The content platform 150 receives a request for attribution 162 (350). For example, the attribution processing apparatus 180 can generate and transmit a request for attribution 162 to the one or more content platforms to check if the content platforms wants to get attributed for the user action of downloading the second application 176. The request for attribution 162 can be generated in response to the attribution processing apparatus 180 receiving the install notification. In some implementations, the attribution processing apparatus 180 can maintain a log of all the install notifications for a period of time and generate a request for attribution 162 for each of the install notifications after the period of time. The request for attribution 162 can include the digital component identifier that can indicate to the content platform 150, the digital component to which the attribution processing apparatus 180 is referring. For example, the attribution processing apparatus 180 transmits a request for attribution 162 to the content platform 150 that includes the digital component identifier of the digital component 129.

The content platform 150 generates and transmits a response to the request for attribution 162 (360). For example, the content platform 150 in order to be attributed for the user action of interacting with the digital component 129 or downloading (or installing) the application 126 referenced by the digital component 129, can respond to the request for attribution 162. The response can include an attribution data set (e.g., second set of data) including the hash values (or actual values) of the first attestation token 122, the second attestation token 124 and the third attestation token 126 that were received by the content platform 150 from the client device 110. For example, the first attestation token 122 was included in the request for digital component 120, the second attestation token 124 was included in the display notification 123 and the third attestation notification 126 was included in the interaction notification 125.

In some implementations, the content platforms 150 (e.g., SSP or DSP) or the content providers 160 can initiate the attribution process. For example, after receiving the install notification 125 from the client device 110, the content platform 150 can request the attribution processing apparatus 180 for attribution. In such implementations, the request can include the attribution data set including the hash values of the first attestation token 122, the second attestation token 124 and the third attestation token 126 that were received by the content platform 150 from the client device 110.

After receiving the response from the content platform 150, the attribution processing apparatus 180 can obtain and store the hash values of the attribution data set including the hash value of the first attestation token 122, the hash value of the second attestation token 124 and the hash value of the third attestation token 126. The attribution processing apparatus 180 can also store the digital component identifier of the digital component 129.

After receiving the application download data set and the attribution data set from the application server 175 and the content platform 150 respectively, the attribution processing apparatus 180 compares the contents of the two sets to verify that the digital component provided by the content platform 150 and displayed to the user resulted in the download of the application and that the attribution data set was gathered and provided securely without fraud. This comparison can also be used to verify that the client device 110 accessed the application server 175 in response to a user interaction with a digital component 129 that was displayed on the client device 110. The attribution processing apparatus 180 also verifies that the digital component 129 displayed on the client device 110 was provided by a content platform 150 was indeed the actual provider of the digital component 129 and that the content platform 150 provided the digital component 129 in response to the request for digital component 120 transmitted by the client device 110.

Finally, the attribution processing apparatus 180 can attribute the content platform 150 for the user action of downloading and/or installing the second application 176.

Figure 4:
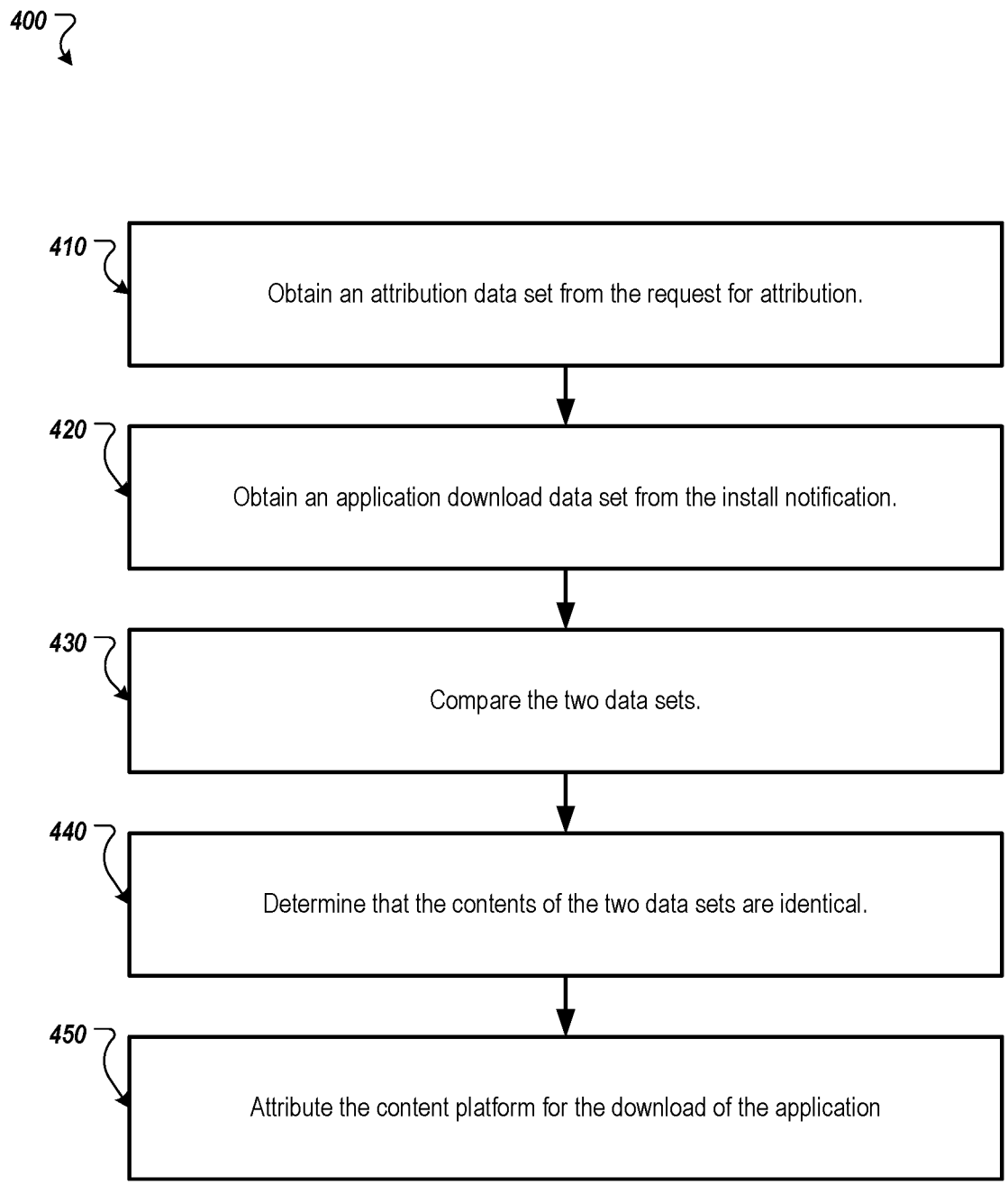
FIG. 4 is a flow diagram of an example process of determining the attribution for the user action of downloading an application.

FIG. 4 is a flow diagram of an example process 400 of determining the attribution for the user action of downloading an application. Operations of process 400 are described below as being performed by the attribution processing apparatus 180. Operations of the process 400 are described below for illustration purposes only. Operations of the process 400 can be performed by any appropriate device or system, e.g., any appropriate data processing apparatus. Operations of the process 400 can also be implemented as instructions stored on a computer readable medium, which may be non-transitory. Execution of the instructions causes one or more data processing apparatus to perform operations of the process 400.

The attribution processing apparatus 180 obtains an attribution data set from the request for attribution 162 (410). The application server 175 (or client device 110 or content platform 150) transmits an install notification to the attribution processing apparatus 180 in response to the client device 110 accessing the application server 175 and downloading and/or installing the second application 176. For example, the application server 175 can notify the attribution processing apparatus 180 regarding the downloading of the second application (application 176) on to the client device 110 after being accessed by the client device 110 using an install notification. In some implementations, the install notification can include an application download data set that includes the hash values of the first attestation token 122, the hash values of the second attestation token 124 and the hash values of the third attestation token 126.

The attribution processing apparatus 180 obtains an attribution data set from the install notification (420). The content platform 150 in order to be attributed for the user action of interacting with the digital component 129 or downloading (or installing) the application 126 referenced by the digital component 129, can respond to the request for attribution 162. The response can include an attribution data set that includes the hash values of the first attestation token 122, the second attestation token 124 and the third attestation token 126 that were received by the content platform 150 from the client device 110. For example, the first attestation token 122 was included in the request for digital component 120, the second attestation token 124 was included in the display notification 123 and the third attestation notification 126 was included in the interaction notification 125.

The attribution processing apparatus 180 compares the application download data set to the attribution data set (430). After receiving the application download data set and the attribution data set from the application server 175 and the content platform 150 respectively, the attribution processing apparatus 180 compares the contents of the two data sets. This comparison between the content of the attribution data set and an application download data set can include comparing the hash value of the first attestation token 122 of the attribution data set to a hash value of an attestation token for a digital component request of the application download data set. This comparison can also include comparing the hash value of the second attestation token 124 of the attribution data set to a hash value of an attestation token for reporting a digital component impression of the application download data set. This comparison can also include comparing the hash value of the third attestation token 126 of the attribution data set to a hash value of an attestation token for reporting a user interaction with the digital component of the application download data set. If all three pairs match, the attribution processing apparatus 180 can determine that the attribution data set matches the application download data set and therefore the attribution processing apparatus 180 attributes the download of the application to the content platform.

The attribution processing apparatus 180 determines that the hash values of the attribution data set and the hash values of the application download data set match based on the comparison (440). For example, the attribution processing apparatus 180 can determine that the hash values of the attribution data set and the hash values of the application download data set are identical based on the comparison.

The attribution processing apparatus 180 attributes the content provider for the user action of interaction with the digital component 129 (450). If the hash values of the individual tokens of the two data sets are identical, the attribution processing apparatus 180 can conclude that the events that led to the display of the digital component 129 on the client device 110, the subsequent user interaction with the digital component 129 and the user action of downloading and/or installing the application 126 from the application server 175 were performed by intended parties (e.g., the client device 110, the content platform 150 and the application server 175) without any interference and/or impersonation by an unintended and/or malicious entity. The attribution processing apparatus 180 can further determine that the content platform 150 provided the digital component 129 to the client device 110 that led to the user action of downloading and/or installing the second application 176 on the client device and attribute the content platform 150. The attribution processing apparatus 180 can then attribute the content platform accordingly for the user action of downloading and/or installing the second application 176.

In some implementations, the attribution processing apparatus 180 can consider other criteria in determining whether and how to attribute credit for the download or installation of an application. For example, one or more hash value comparisons can be used to determine whether a content platform 150 contributed in some way to the download or installation of the application. In a particular example, attribution processing apparatus 180 can use the hash value comparison for the display notification to determine whether each content platform 150 that requests attribution for the download or installation of an application at a particular client device 110 contributed to the display of a digital component related to the application. If so, the attribution processing apparatus 180 can consider providing at least a portion of the attribution credit to that content platform 150.

The attribution processing apparatus 150 can use various rules or other attribution allocation models to assign attribution to each of one or more content platforms 150 that contributed to the display of a digital component related to the application at the particular client device 110. For example, each content platform 150 can provide its attestation tokens (and optionally their corresponding hash values) related to the download or installation of the application at the particular client device 110. Each attestation token can include, as payload data, metadata to prove that it is related to the eventual application downloading. Such metadata can be divided into two categories: a hash of attestation token for the event immediately before the current event in the casualty chain and a description of the event, e.g. the display event contains metadata explaining that the current digital component is to promote a particular application, and is shown in a particular digital component slot. Another example is user interaction attestation, which contains metadata verified by the trusted application 114 that the user interacted with a digital component slot owned by an application who has been showing digital components for the particular application in the same digital component slot. Some description may be declared by the application that displays the digital component and more description is verified by the operating system or other trusted application 114.

Depending on the attribution rules, the attribution processing apparatus 150 can split the total credit between multiple content platforms 150 that passed the hash value check(s). For example, content platform A displays a digital component with content related to the particular application, but the user did not interact with this digital component. Content platform B displays another digital component with content related to the particular application that led to a user interaction with the digital component and the eventual installation of the particular application. The attribution rule may be such that content platform B gets ⅔ of total credit and content platform A gets ⅓ of the total credit. However, each content platform would need to provide their respective attestation token(s) to request the attribution. For example, content platform A would provide, to the attribution processing apparatus 180, attestation tokens for the digital component request and/or display notification and content platform B would provide, to the attribution processing apparatus 180, attestation tokens for its digital component request, display notification, and user interaction notification. Each content platform can provide the hash values for the tokens to the attribution processing apparatus 180.

Figure 5:
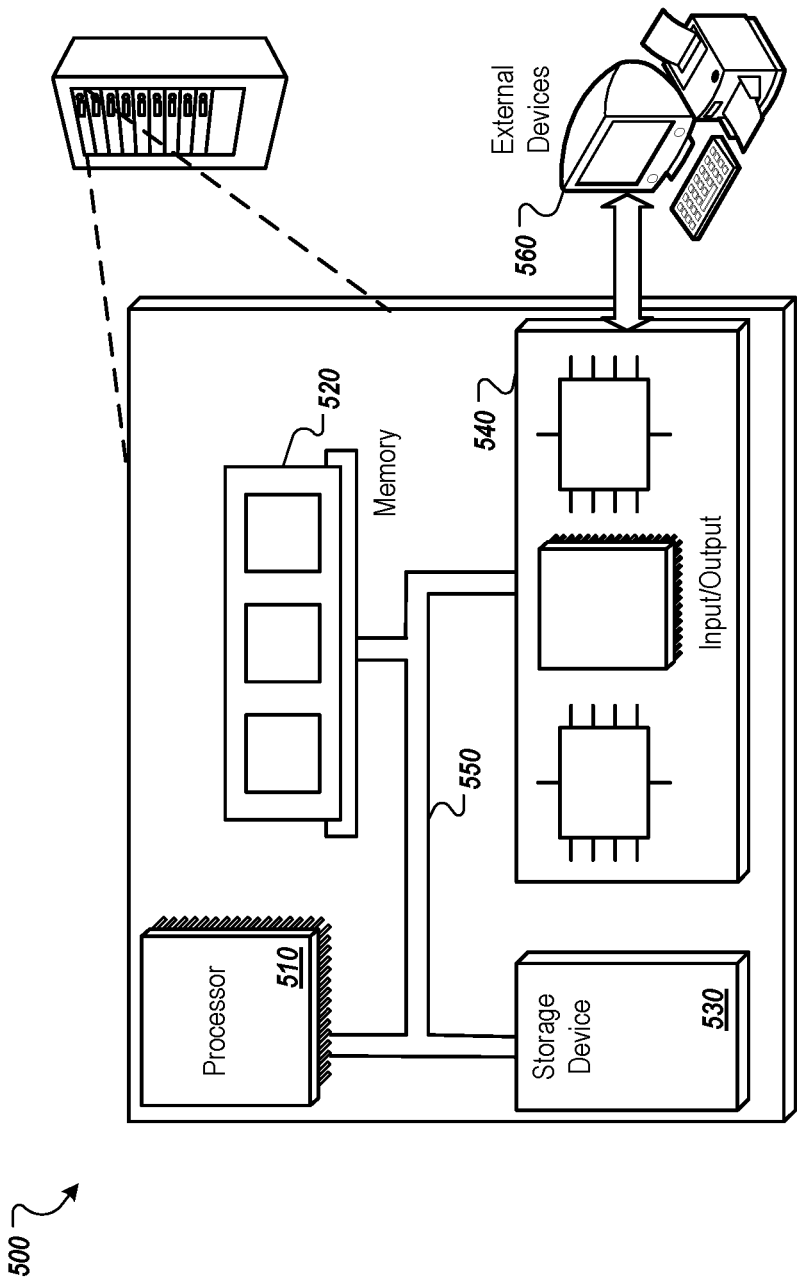
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   receiving, by a content platform and from a first application executing on a client device, a request for one or more digital components, wherein the request comprises a first anonymous token comprising (i) a set of content comprising at least data indicating a level of trust for the client device, (ii) a request creation timestamp, and (iii) a digital signature generated using the set of content;
   transmitting, by the content platform and to the first application, a response comprising (i) data for a digital component comprising content related to a second application and (ii) a hash value of the first anonymous token;
   receiving, by the content platform and from the first application, a display notification indicating the display of the digital component via the first application, the display notification including a second anonymous token and the hash value of the first anonymous token;
   receiving, by the content platform and from the first application in response to an interaction with the digital component by a user of the client device, an interaction notification including a third anonymous token and a hash value of the second anonymous token;
   receiving, by the content platform and from an attribution processing apparatus, a request for attribution; and
   generating and transmitting, by the content platform and to the attribution processing apparatus, a response to the request for attribution comprising the hash value of the first anonymous token, the hash value of the second anonymous token and a hash value of the third anonymous token.

2. The computer-implemented method of claim 1, further comprising:
   generating, by the client device and based on the content related to a second application that was included in the digital component, a Universal Resource Locator (URL) for the second application stored in an application server, the URL comprising the hash value of the first anonymous token, the hash value of the second anonymous token and the hash value of the third anonymous token;
   redirecting, the first application to the application server using the URL; and
   in response to redirecting the first application to the application server, downloading, by the client device and from the application server, the second application.

3. The computer-implemented method of claim 1, further comprising:
   transmitting, by a client device to a device integrity computing system, a request for N anonymous tokens; and
   receiving, by the client device from the device integrity computing system, the N anonymous tokens.

4. The computer-implemented method of claim 1, further comprising:
   storing, by the client device, the first anonymous token on the client device for a predetermined period of time;
   wherein generating the second anonymous token for inclusion in the display notification comprises:
      obtaining, by the client device, the first anonymous token that was stored on the client device;
      obtaining, by the client device, the hash value of the first anonymous token that was included in the response from the content platform;
      comparing, by the client device, a hash value of the first anonymous token that was stored on the client device and the hash value of the first anonymous token that was included in the response from the content platform;
      determining, by the client device that the hash value of the first anonymous token that was stored on the client device is identical to the hash value of the first anonymous token that was included in the response from the content platform; and
      generating, by the client device and in response to determining that the hash value of the first anonymous token that was stored on the client device is identical to the hash value of the first anonymous token that was included in the response from the content platform, the second anonymous token.

5. The computer-implemented method of claim 4, further comprising determining by the client device to not generate the second anonymous token, in response to not determining that the hash value of the first anonymous token that was stored on the client device is identical to the hash value of the first anonymous token that was included in the response from the content platform.

6. The computer-implemented method of claim 1, further comprising:
    obtaining, by the attribution processing apparatus and from an application server, a first set of data comprising the hash value of the first anonymous token, the hash value of the second anonymous token and the hash value of the third anonymous token;
    obtaining, by the attribution processing apparatus and from the response to the request for attribution, a second set of data comprising hash values received from the content platform;
    comparing, by the attribution processing apparatus, the first set of data to the second set of data;
    determining, by the attribution processing apparatus, that the first set of data matches the second set of data; and
    in response to determining that the first set of data matches the second set of data, attributing by the attribution processing apparatus, the content platform for a download of the second application.

7. The computer-implemented method of claim 1, wherein:
    each anonymous token comprises a respective token comprising a set of content for a device integrity token, wherein the set of content for the device integrity token comprises a verdict of trustworthiness indicating the level of trust for the client device, a timestamp indicating a time at which the verdict of trustworthiness was determined, and public key data for the device integrity token; and
    generating each device integrity token comprises digitally signing the set of content for the device integrity token using a private key of the device integrity computing system.

8. The computer-implemented method of claim 1, further comprising determining respective attribution credits for multiple content platforms based on anonymous tokens for events related to the second application received from the multiple content platforms.

9. A system comprising:
    one or more processors; and
    one or more storage devices storing instructions that, when executed by the one or more processors, cause the one or more processor to perform operations comprising:
        receiving, by a content platform and from a first application executing on a client device, a request for one or more digital components, wherein the request comprises a first anonymous token comprising (i) a set of content comprising at least data indicating a level of trust for the client device, (ii) a request creation timestamp, and (iii) a digital signature generated using the set of content;
        transmitting, by the content platform and to the first application, a response comprising (i) data for a digital component comprising content related to a second application and (ii) a hash value of the first anonymous token;
        receiving, by the content platform and from the first application, a display notification indicating the display of the digital component via the first application, the display notification including a second anonymous token and the hash value of the first anonymous token;
        receiving, by the content platform and from the first application in response to an interaction with the digital component by a user of the client device, an interaction notification including a third anonymous token and a hash value of the second anonymous token;
        receiving, by the content platform and from an attribution processing apparatus, a request for attribution; and
        generating and transmitting, by the content platform and to the attribution processing apparatus, a response to the request for attribution comprising the hash value of the first anonymous token, the hash value of the second anonymous token and a hash value of the third anonymous token.

10. The system of claim 9, wherein the operations further comprise:
    generating, by the client device and based on the content related to a second application that was included in the digital component, a Universal Resource Locator (URL) for the second application stored in an application server, the URL comprising the hash value of the first anonymous token, the hash value of the second anonymous token and the hash value of the third anonymous token;
    redirecting, the first application to the application server using the URL; and
    in response to redirecting the first application to the application server, downloading, by the client device and from the application server, the second application.

11. The system of claim 9, wherein the operations further comprise:
    transmitting, by a client device to a device integrity computing system, a request for N anonymous tokens; and
    receiving, by the client device from the device integrity computing system, the N anonymous tokens.

12. The system of claim 9, wherein the operations further comprise:
    storing, by the client device, the first anonymous token on the client device for a predetermined period of time;
    wherein generating the second anonymous token for inclusion in the display notification comprises:
    obtaining, by the client device, the first anonymous token that was stored on the client device;
    obtaining, by the client device, the hash value of the first anonymous token that was included in the response from the content platform;
    comparing, by the client device, a hash value of the first anonymous token that was stored on the client device and the hash value of the first anonymous token that was included in the response from the content platform;
    determining, by the client device that the hash value of the first anonymous token that was stored on the client device is identical to the hash value of the first anonymous token that was included in the response from the content platform; and
    generating, by the client device and in response to determining that the hash value of the first anonymous token that was stored on the client device is identical to the hash value of the first anonymous token that was included in the response from the content platform, the second anonymous token.

13. The system of claim 12, wherein the operations further comprise: determining by the client device to not generate the second anonymous token, in response to not determining that the hash value of the first anonymous token that was stored on the client device is identical to the hash value of the first anonymous token that was included in the response from the content platform.

14. The system of claim 9, wherein the operations further comprise:
   obtaining, by the attribution processing apparatus and from an application server, a first set of data comprising the hash value of the first anonymous token, the hash value of the second anonymous token and the hash value of the third anonymous token;
   obtaining, by the attribution processing apparatus and from the response to the request for attribution, a second set of data comprising hash values received from the content platform;
   comparing, by the attribution processing apparatus, the first set of data to the second set of data;
   determining, by the attribution processing apparatus, that the first set of data matches the second set of data; and
   in response to determining that the first set of data matches the second set of data, attributing by the attribution processing apparatus, the content platform for a download of the second application.

15. The system of claim 9, wherein:
   each anonymous token comprises a respective token comprising a set of content for a device integrity token, wherein the set of content for the device integrity token comprises a verdict of trustworthiness indicating the level of trust for the client device, a timestamp indicating a time at which the verdict of trustworthiness was determined, and public key data for the device integrity token; and
   generating each device integrity token comprises digitally signing the set of content for the device integrity token using a private key of the device integrity computing system.

16. The system of claim 9, wherein the operations further comprise: determining respective attribution credits for multiple content platforms based on anonymous tokens for events related to the second application received from the multiple content platforms.

17. A computer readable storage medium carrying instructions that, when executed by one or more processors, cause the one or more processors to perform operations comprising:
   receiving, by a content platform and from a first application executing on a client device, a request for one or more digital components, wherein the request comprises a first anonymous token comprising (i) a set of content comprising at least data indicating a level of trust for the client device, (ii) a request creation timestamp, and (iii) a digital signature generated using the set of content;
   transmitting, by the content platform and to the first application, a response comprising (i) data for a digital component comprising content related to a second application and (ii) a hash value of the first anonymous token;
   receiving, by the content platform and from the first application, a display notification indicating the display of the digital component via the first application, the display notification including a second anonymous token and the hash value of the first anonymous token;
   receiving, by the content platform and from the first application in response to an interaction with the digital component by a user of the client device, an interaction notification including a third anonymous token and a hash value of the second anonymous token;
   receiving, by the content platform and from an attribution processing apparatus, a request for attribution; and
   generating and transmitting, by the content platform and to the attribution processing apparatus, a response to the request for attribution comprising the hash value of the first anonymous token, the hash value of the second anonymous token and a hash value of the third anonymous token.

18. The computer readable storage medium of claim 17, wherein the operations further comprise:
   generating, by the client device and based on the content related to a second application that was included in the digital component, a Universal Resource Locator (URL) for the second application stored in an application server, the URL comprising the hash value of the first anonymous token, the hash value of the second anonymous token and the hash value of the third anonymous token;
   redirecting, the first application to the application server using the URL; and
   in response to redirecting the first application to the application server, downloading, by the client device and from the application server, the second application.

19. The computer readable storage medium of claim 17, wherein the operations further comprise:
   transmitting, by a client device to a device integrity computing system, a request for N anonymous tokens; and
   receiving, by the client device from the device integrity computing system, the N anonymous tokens.

* * * * *